Aug. 18, 1959  F. J. DITTER  2,900,158
SUPPORT
Filed Oct. 22, 1954  2 Sheets-Sheet 1
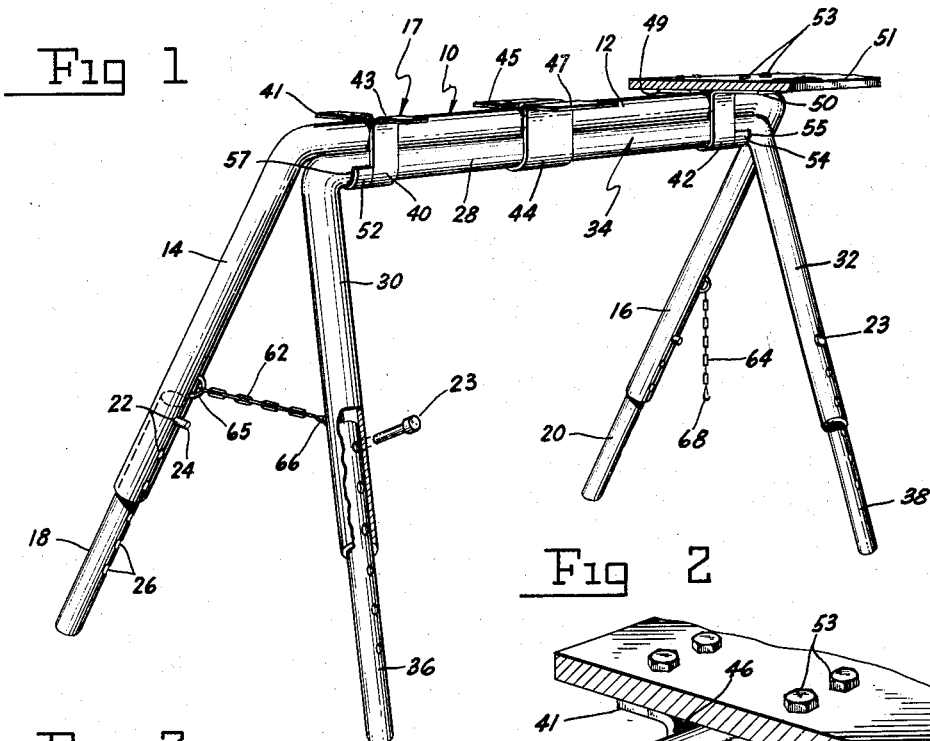
INVENTOR.
Francis J. Ditter
BY
William C. Stueber
ATTORNEY Aug. 18, 1959          F. J. DITTER          2,900,158
SUPPORT
Filed Oct. 22, 1954          2 Sheets-Sheet 2
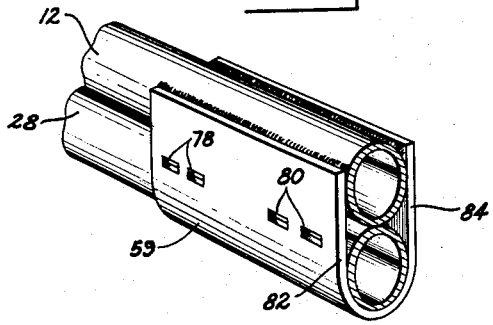
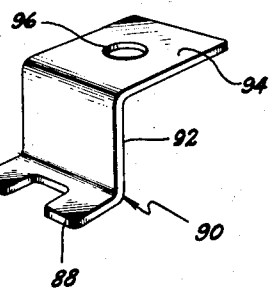
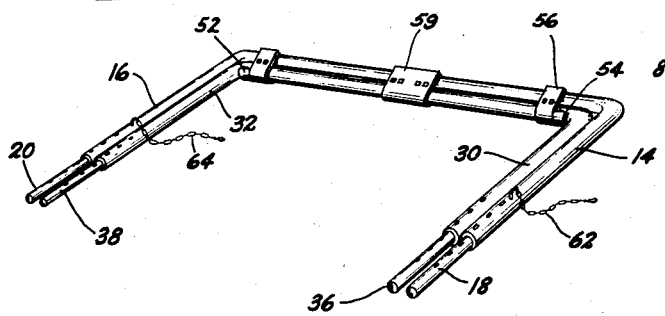
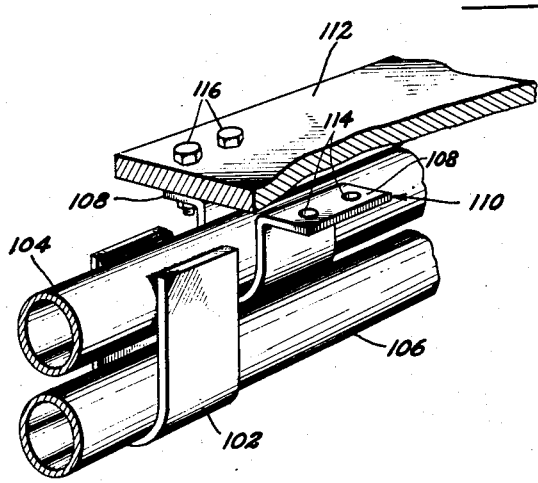
INVENTOR.
Francis J. Ditter
BY
William C. Stueber
ATTORNEY

United States Patent Office 2,900,158
Patented Aug. 18, 1959

2,900,158
SUPPORT

Francis J. Ditter, Minneapolis, Minn., assignor to Federal Hardware Products, Inc., Minneapolis, Minn., a corporation of Minnesota Application October 22, 1954, Serial No. 463,858

10 Claims. (Cl. 248—166)

This invention relates to improvements in supports of the type used for furnishing temporary support to work surfaces, tables, scaffolding and the like. These supports are also known to the art as trestles and are sometimes referred to as "horses."

Supports or trestles of this type are useful and necessary in a great variety of operations and they are particularly used as temporary supports for holding scaffolding, work benches, platforms, tables, planks and the like. They may also be used as permanent supports or legs for similar work surfaces. They may be utilized in locations such as factories and industry where a strong support is necessary but which must be portable so that it can be disassembled and set up in another location. These supports are used as temporary supports in a number of building trades, by carpenters, masons, plasterers, painters, metal workers, and maintenance men. They also are popular with home owners. For all these uses it is important that the supports be strong and reliable and yet not so heavy and cumbersome that they are impractical for transporting and relocating.

Accordingly it is an object of the present invention to provide an improved trestle or support which is extremely simple in structure and thereby is inexpensive to manufacture but which is sufficiently strong and rugged to be suitable for extremely hard usage.

Another object of the invention is to provide an improved support which may be made primarily from tubing utilizing a small number of parts and which may be formed and assembled by a minimum of shaping and welding steps.

Another object of the invention is to provide a support which is very rigid when erected and yet which may be folded to a flattened unit consuming a minimum of space and which may be folded without detaching from the supported bench.

A still further object of the invention is to provide a folding support which has no inconvenient or dangerous projecting parts and which may be used as a temporary support, but which may be easily adapted to use as a permanent support when a table surface or a plank is secured to the top.

Further objects and advantages of the invention will become more apparent in the following specification taken in connection with the appended drawings, in which Figure 1 is a perspective view of the support embodying the features of the present invention;

Fig. 2 is an enlarged detailed view of a portion of the support illustrating the clamp which is used as a hinge to connect the support members;

Fig. 3 is a detailed perspective view of the limit member which enhances the strength of the support;

Fig. 4 is a side elevational view illustrating an alternative embodiment of the hinge member which has a removable ear for attaching a supporting surface such as a table;

Fig. 5 is a sectional view taken along line 5—5 of Fig. 4;

Fig. 6 is a perspective view of a center hinge illustrating the alternate form of the type of hinge shown in Fig. 4 illustrated with the attaching ears removed;

Fig. 7 is an enlarged perspective view showing the details of the ear for attaching the support surface;

Fig. 8 is a perspective view illustrating the support of Fig. 1 in collapsed or folded position; and Fig. 9 is a perspective view illustrating another embodiment which permits both sets of legs to be folded flat against an attached table.

With reference to Fig. 1, the trestle or support 10 is shown in erected position as it may be used in a shop or factory for temporarily supporting work or for supporting a platform or table which may be temporarily or permanently secured to the top in a manner which will be later described.

The work support or trestle 10 has a top horizontal support bar 12 which is located where it will be directly adjacent or in contact with the load carried by the support. This load may be in the form of a plank or table 51. At each end of the support bar 12 are legs 14 and 16 extending at right angles therefrom so as to form an integral U-shaped support member, the U-shaped member being designated as 17. The support members are preferably tubular in form and may be made out of strong pipe bent to shape.

The legs 14 and 16 may have extension legs 18 and 20 respectively, which are adjustably secured in the legs so as to adjust the height of the support member as a whole. For this purpose the leg 14 has a number of holes 22 which admit a pin 24. The pin also extends through any one of a number of holes 26 in the lower extension leg 18. Therefore the pin 24 extending through one of the holes 22 in the leg and one of the holes 26 in the extension 18 locks the two together at a certain length to carry the horizontal support 12.

The connection between the lower extension leg and the tubular leg of the support bar is the same for all four of the support legs and therefore only one need be described in detail.

Positioned directly beneath the top support bar 12 is a second support bar 28. The second or lower support bar 28 has at its ends legs 30 and 32 which extend substantially at right angles from the support bar so as to form a lower U-shaped member, designated as a whole as 34 which is similar in construction to the upper U-shaped member 17. It is to be noted, however, that this lower U-shaped member 34 has a shorter base, or in other words, the lower bar 28 is shorter than the top bar 12 so that when the support is folded for transport or storage in the manner shown in Fig. 8 the legs 30 and 32 will lie within the legs 14 and 16. This permits the support to be almost completely flattened and reduces the space required for storage and also makes transporting it much easier.

The legs 30 and 32 of the lower supporting U-shaped member have lower extension legs 36 and 38 respectively. These extension legs are constructed the same as the leg 18 which was described in detail. These extension legs are also secured in their adjusted positions by pins 23 which pass through holes in the tubular legs 30 and 32 and through corresponding holes in the legs 36 and 38. The extension legs are slidable within the tubular legs as may be seen in the cutaway portion of the leg 30, and therefore by telescoping each of the extension legs into or out of the mating tubular legs the height of the support as a whole may be adjusted.

It is preferred that each of the extension legs be telescoped the same distance into the leg above it so that the support will stand level. To do this, each extension is slid into the upper leg the proper amount until the holes in the hollow leg are aligned with the hole in the extension and then the pin is inserted to lock the legs in their relative positions.

To connect the upper support bar 12 to the lower bar 28, a pair of U-shaped clamping fingers 40 and 42 are provided at each end of the bars with a further clamping hinge 44 at the center. These hinges not only pivotally attach the two U-shaped members, but also greatly enhance the strength of the assembly, as will later be more clearly explained.

Each of the U-shaped hinges is provided with ears for attaching a table or plank to the top. Hinge 40 has ears 41 and 43 and hinge 44 is shown with ears 45 and 47. Hinge 42 has ears 49 and 50 and illustrates how a plank 51 may be attached to these ears by a bolt 53 extending through holes in the ears and in the plank. This feature is also shown in Fig. 2.

In certain cases the ears may be made removable as shown in Figs. 4, 5, and 6 and this feature will be later described in detail.

As is shown in the enlarged detail of Fig. 2, the U-shaped clamps or hinges are secured to the top bar 12 as by weld beads 46 and 48, extending along the top and sides of the hinge member and welding it to the tubular bar 12.

The lower bar 28, although positioned snugly within the loop of the U-shaped hinge member, is free to rotate therein and acts in some respects as a pintle to permit rotation of the two bars 12 and 28 in respect to each other. Although this relative rotation is permitted, the axial position is at all times fixed and the extent of rotation is limited. This fixed position and limited rotation is of importance in that when the support is erected the lower support bar 28 is directly beneath the top bar 12, as is shown in Fig. 5. From this figure it will be seen that the lower surface of the top bar 12 bears against the upper surface of the lower bar 28 so that they act in unison in giving support to the load placed thereon.

This action in unison or concert of action is enhanced by several other important structural features, the first being the central U-shaped hinge member 44, and the second being the limit members 52 and 54.

First considering the central hinge 44, this member is preferably wider than the U-shaped hinge members 40 and 42 since it must not only act as a hinge but also as a strengthening member to aid in the concert of action of the two support bars 12 and 28 and prevent their separation. The central hinge member 44 is attached to the support member 12 in the same manner as is the hinge member 40 as described in connection with Fig. 2. The hinge member 44 is welded to the top bar 12 and is drawn securely around the lower bar so as to hold it snugly against the top bar but to permit its free rotation. The other hinge member 42 is likewise similarly connected to the support member by being welded to the upper support bar 12 and is snugly drawn around the lower bar 28 but permits rotation thereof. These hinge members therefore tend to keep the horizontal bars 12 and 28 in line contact.

The second feature which functions to keep the upper and lower support bars in line contact and insures their acting in concert, is the limit members 52 and 54. One of these members is illustrated in the enlarged detail of Fig. 3 and the members are in the form of half of an annular ring having an inside diameter the same as the outside diameter of the lower bar 28. The limit member 52 is positioned on the undersurface of the bar 28 outside of the hinge member 40 or between the leg 30 and the hinge member. It is there welded in place, such as by weld bead 57.

Limit member 54 is similarly positioned outside hinge member 42 or between the hinge member and the leg 32, and is welded by a weld bead 55. It is of prime importance that these two limit members be positioned very tightly against the hinge members, for although they function to prevent the lower bar 28 from sliding longitudinally with respect to the two bars, they primarily function to hold the center portion of these two bars in contact.

This principle can more readily be understood if it is imagined that the center hinge 44 is not present on the support. Actually its presence is not essential but is preferred because of the extra strength advantages it affords to the structure. If the hinge 44 were omitted and a heavy load were applied, say directly above the hinge 40, it will be seen that the pressure of the load would be transmitted through the bar 12 against the upper surface of the bar 28. This would tend to bend the bar 28 downwardly and would cause it to spring away from the bar 12 at the center of the bars. As it would bow downwardly away from 12 it would, of course, tend to draw the ends of the bar 28 or the legs 30 and 32 inwardly, and in so doing there would be a lateral sliding action of the ends of bar 28 through the hinges 40 and 42. Although the sliding action is minute, if this sliding action is positively prevented as it is by the limit members 52 and 54, the bar 28 can not bow and become shorter than bar 12 and therefore can not spring down away from the upper bar 12. The two must remain in contact at their center and this will insure a concert of action and thus obtain a stronger beam.

Since it is important to the operation of the support that the lower bar 28 be directly beneath the top bar 12, it is important that the hinge members 40, 42 and 44 be connected to the top bar at the proper angle. This angle is determined, as may be seen in connection with Fig. 5, by the relative postion of the hinges and legs 16 and 32 of the support when it is erected.

The U-shaped hinge member shown as 56 in Fig. 4 has flat straight side walls 58 and 60, and if these walls are in a vertical position and extend vertically downward from the upper support bar 12 when the legs 16 and 32 are spread, then the lower bar 28 will be positioned directly below the top bar.

The spread position of the legs is fixed by chains 62 and 64 connected between legs 14 and 30, and 16 and 32 respectively. These chains are suitably secured to the legs as by being secured to an eye 65 on one leg and by being provided with snaps 66 and 68 which are to be snapped in an eye (not shown) on the other leg 30. Chain 64 is unhooked for purposes of illustration of the unsnapped position. The chain may be welded or otherwise secured to the legs, but as shown the chain may be disconnected by unsnapping the snaps 66 and 68 when the support is folded flat in the manner shown clearly in Fig. 8 and may be wrapped around the legs to hold them together.

Another way to secure the chain would be to connect the ends to the beads of the pins 22. The pins would hold the chains in position on the legs and also permit them to function to prevent the legs from spreading beyond a fixed limit.

Returning now to the discussion of the angle of attachment of the hinge members 40, 42, and 44, in Fig. 4 it will be seen that the angle between the legs is $\theta$ plus $\theta'$, $\theta$ and $\theta'$ being equal and each being half the total angle between the legs. It will be further seen from the above that in order to have the sides 58 and 60 of the hinge member extend vertically downward from the upper support bar 12, they must be welded to the upper support bar so that they form an angle with the leg 16 equal to $\theta$ or equal to half the total angle between the legs when spread. Thus the angle between the hinge and the top support bar is equal to half the angle between the legs when spread and this achieves a positional relationship insuring that the bar 28 will be directly below the bar 12.

In some instances when the supports are to be used as temporary supports with the load being frequently changed, it is not desirable to attach the load to the support as is shown with the embodiment of Fig. 1. In these cases it is advantageous not to have the ears such as 41 and 43 in Fig. 2 on the hinge members since they present a hazard to personnel and consume extra space for storage. Yet in some cases it is desirable to be able to attach a member to the top where the support is to be pressed into service which requires securely attaching a table or platform to its top and for these instances the embodiment of Figs. 4 through 7 utilizes removable attaching ears.

To obtain a support or trestle which may be used either for temporary or for more permanent use, this embodiment is provided with removable ears which obtain the advantages of the fixed ears and yet may be disassembled from the support to obtain a smooth surface which is free from inconvenient projections.

For this embodiment the hinge members are shown at 56 in Figs. 4 and 5 and 59 in Fig. 6 and are similar to the hinge members 40, 42, and 44 in Fig. 1 but have the upper horizontal ears removed. The hinge member 56 or 59 is welded along its upper and side edges to the top bar 12 and the lower bar 28 is free to rotate in the hinge member. The limit member 76 is welded to the lower bar and bears against the edge of the hinge, Fig. 4.

A pair of horizontal extending slots 78 and 80 are cut in the hinge member as shown in Fig. 6 and are cut in each of the vertical side walls 82 and 84. The slots are spaced so that they will be between the upper and lower bars 12 and 28, so that the fingers 86 and 88 of the removable ear 90, Fig. 7 and Fig. 4, can freely project into the slots without interference with the bars. The removable ear 90 has a vertical side wall portion 92 from which extend the horizontal fingers 86 and 88, and at its upper edge extends a horizontal face portion 94 in which is drilled a hole 96 for securing a table or plank 51 to the support in the manner shown in Fig. 5. For this purpose a bolt 98 and a bolt 100 extend through the holes in the table and through the holes in the ears. It will be seen from the section view of Fig. 5 that these bolts, while holding the planks to the top of the support, also prevent the ears from moving laterally away from the hinge member 56 so as to keep the fingers 86 and 88 within the slots.

Thus it will be seen that with the removable ears a structure substantially as rigid as the structure with the fixed ears is obtained, but that the ears may be quickly and easily removed from the hinges and stored when not in use to have a smooth hinge free from obstructing projections, as is shown in Fig. 6.

As is illustrated in Fig. 8 the support or trestle can be collapsed to a substantially flat form for stacking and storing. In some instances, where a table or bench is to be attached to the supports over a long period of time it may be desirable to fold the legs without removing the table. In these cases, the embodiment of Figs. 9 and 10 may be used.

This embodiment requires that the ears for attaching the table be hingedly secured to the top bar. Hinges 102 without ears similar to those of Figs. 4, 5, and 6 may be used. The hinges have to be slightly longer, however, to permit the table-attaching clip to pass between the support bars 104 and 106.

The clip is shaped and hugs the upper bar with lateral ears 108 and 110 extending at the end of the top bar 104 for securing to the table 112. The clip is laterally offset from the hinge as shown in Fig. 12. With this construction the straight line contact between the support bars must be sacrificed but the load on the top bar is transmitted to the lower through the portion of the clip that extends between them.

In some instances it will be desirable to leave the supports attached to the same table for long periods of time and yet fold the unit between uses. These objectives are especially met by the embodiment illustrated in Fig. 9.

In this connection a U-shaped hinge 102 is used similar to that of Figs. 4, 5, and 6 except that the side slots may be omitted and the sides are slightly longer to allow for a space between the horizontal bars 104 and 106. This space allows for the table-connecting clip 110. This clip is U-shaped with horizontal ears such as 108. These ears are provided with holes 114 to receive bolts 116 to attach the table 112.

The lower legs, not shown, will be integral with the bar 106 and can pivot with respect to the other part of the support which includes the bar 104. The entire unit, however, can pivot with respect to the table 112 to lie flat thereagainst. This pivotal action is accomplished by bar 104 rotating in the clip 110. Other clips like 110 are of course provided along the bar 104. These clips fill the space between the bars and transmit the load from the top to the lower bar to insure a concert of action similar to the supports of Fig. 1 or Fig. 4.

It will be seen that the support member which I have provided is especially simple in structure, consisting of only a few parts, and may be made of cheap materials such as pipe and metal plates. The device is susceptible of economical manufacturing processes requiring only a few bending and welding operations.

The support is especially advantageous since it is capable of holding very heavy loads obtaining optimum strength for the top supporting bars. This strength and simplicity of structure obtains a support which is very light in weight and therefore can be easily transported and handled. This simplicity of handling is augmented by the fact that the support can be folded to use a very small space. Further, the embodiment which makes it possible to remove the ears to change the support surface also reduces the necessary space and makes the support suited to many and various uses.

I claim as my invention:

1. A support comprising in combination a first U-shaped supporting member having a top supporting bar with legs at the ends, a second U-shaped supporting member having a top bar with legs at the ends, said second supporting member having a shorter top bar than the first supporting member so that the legs of the second member will pass inside of the first with relative pivotal movement, means for pivotally connecting said top bars with the second top bar positioned directly beneath the first top bar when the legs are in spread position, means to limit the relative pivotal movement of the support members to prevent the legs from spreading beyond a predetermined distance, and means for holding the said first and second top bars in continual line contact to obtain concert of action and enhance their strength.

2. A support comprising in combination a first supporting member having a top supporting bar with legs at the ends, a second supporting member having a top bar with legs at the ends, a hinge pivotally joining the second bar and the first bar to permit relative pivotal movement of said bars, and means to limit the pivotal movement of said bars to prevent the separation of the legs beyond a predetermined distance, said first top supporting bar positioned directly above the second bar so that the longitudinal axes of said bars lie in a vertical plane with said bars touching in line contact to obtain a concert of action in resisting a vertical load applied to the first top bar.

3. A support comprising in combination a first U-shaped supporting member having a top supporting bar with legs at the ends, a second U-shaped supporting member having a top bar with legs at the ends, a U-shaped hinge member embracing the second bar in the bottom of the U and secured to said first bar at the open end of the U thereby retaining said bars in line contact and permitting relative pivotal movement of said bars, and means to limit the relative pivotal movement of the bars to prevent the legs from spreading beyond a predetermined distance.

4. A support comprising in combination a first U-shaped supporting member having a straight top supporting bar with legs at the ends, a second U-shaped supporting member having a straight top bar with legs at the ends, a first U-shaped hinge freely surrounding the second bar and secured to the first bar at a first end, a second U-shaped hinge surrounding the second bar and secured to the first bar at the second end, a limit member secured to the second bar and positioned tightly against the first hinge between said first hinge and the leg, a second limit member secured to the second bar and positioned tightly against the second hinge between the hinge and the leg, said limit members preventing the second bar from bowing in excess of the first bar and tending to hold the bars in contact, and means for limiting the pivotal movement of the U-shaped members with respect to each other to limit the spread of the legs beyond a predetermined distance.

5. A support comprising in combination a first U-shaped supporting member having a straight top supporting bar with legs at the ends, a second U-shaped supporting member having a straight top bar with legs at the ends, a first pivotal connecting means securing the second bar to the first bar and located at one end of said bars, second pivotal connecting means also connecting the second bar to the first bar and located at the second end of said bars, a U-shaped hinge member embracing the second bar at the lower end and secured to the first bar at the open end, the second bar in straight-line engagement with the first bar, said hinge members permitting relative pivotal movement between said U-shaped members, and means to limit the spread of the legs between the U-shaped members to a predetermined distance.

6. A support comprising in combination a first U-shaped supporting member having a straight top supporting bar with legs at the ends, a second U-shaped supporting member having a straight top bar with legs at the ends, a U-shaped hinge member embracing the second bar and secured to the first bar to retain said bars in contact one above the other and to permit relative pivotal movement therebetween, ears projecting laterally from the sides of the hinge member for securing a supporting surface to the support, and means for limiting the relative movement of the legs to a predetermined distance.

7. A support comprising in combination a first U-shaped supporting member having a straight top supporting bar with legs at the ends, a second U-shaped supporting member having a straight top bar with legs at the ends, a U-shaped hinge member having a rounded base and flat sides with the second bar positioned within the rounded bottom to underlie and engage the first supporting bar and the flat sides being fixedly secured to the first supporting bar and loosely engaging opposite side portions of said second bar, means limiting the pivotal spreading movement between the bars so as to fix the angle between the legs in the spread position, the angle between a plane medially of the flat side walls of the hinge and the legs of one of the U-shaped supporting members forming an angle equal to one-half the angle between the legs in spread position.

8. A support comprising in combination a first U-shaped supporting member having a straight top supporting bar with legs at the ends, a second U-shaped supporting member having a straight top bar with legs at the ends, means hingedly connecting the first bar to the second bar, ears detachably connected to said bars and extending horizontally from the bars in erected position of the support, and means on the ears for securing a supporting surface to the support.

9. A support comprising in combination a first U-shaped supporting member having a top supporting bar with legs at the ends, a second U-shaped supporting member having a top bar with legs at the ends, a U-shaped hinge member for pivotally connecting the first and second U-shaped members, said hinge encircling the second bar and secured to the first bar, openings in the side walls of the U-shaped hinge members, ears for securing a supporting surface to the supporting members, said ears having fingers which fit into said openings to detachably secure the ears to said U-shaped hinge members, and means for limiting the relative spread between the legs of the U-shaped supporting members.

10. A support comprising an upper horizontal bar provided with a downwardly extending leg at each end, a lower horizontal bar in longitudinal engagement with said upper bar, said lower bar also having a downwardly extending leg at each end, and a U-shaped hinge member having its closed end extending under said lower bar and its sides extending upwardly in a tangential relation with side portions of both of said horizontal bars, the sides of said hinge being fixedly secured only to said upper bar so as to retain said horizontal bars in said longitudinal engagement.

References Cited in the file of this patent

UNITED STATES PATENTS

| | | |
|---|---|---|
| 351,990 | Mansure | Nov. 2, 1886 |
| 386,524 | Casler | July 24, 1888 |
| 415,638 | Hawks | Nov. 19, 1889 |
| 812,344 | Howser | Feb. 13, 1906 |
| 836,551 | Wesner | Nov. 20, 1906 |
| 1,518,886 | White | Dec. 9, 1924 |
| 1,696,193 | Deland | Dec. 25, 1928 |
| 2,646,237 | Hinesman | July 21, 1953 |
| 2,699,201 | Levy | Jan. 11, 1955 |

FOREIGN PATENTS

| | | |
|---|---|---|
| 115,882 | Sweden | Feb. 19, 1946 |
| 209,946 | Switzerland | Aug. 16, 1940 |
| 861,121 | France | Oct. 22, 1940 |